United States Patent
Li et al.

(10) Patent No.: US 10,907,696 B2
(45) Date of Patent: Feb. 2, 2021

(54) CARBON BRAKE WEAR STATUS MONITORING SYSTEM

(71) Applicant: HONEYWELL INTERNATIONAL INC., Morris Plains, NJ (US)

(72) Inventors: Qixiang Li, Beijing (CN); Dinkar Mylaraswamy, Fridley, MN (US); Fong Wee, Phoenix, AZ (US); Ramon Blanco Encinas, Gilbert, AZ (US)

(73) Assignee: Honeywell International Inc., Charlotte, NC (US)

( * ) Notice: Subject to any disclaimer, the term of this patent is extended or adjusted under 35 U.S.C. 154(b) by 195 days.

(21) Appl. No.: 16/158,680

(22) Filed: Oct. 12, 2018

(65) Prior Publication Data

US 2020/0116224 A1 Apr. 16, 2020

(51) Int. Cl.
*F16D 66/02* (2006.01)
*B60T 17/22* (2006.01)
(Continued)

(52) U.S. Cl.
CPC .......... *F16D 66/028* (2013.01); *B60T 17/221* (2013.01); *B64F 5/60* (2017.01);
(Continued)

(58) Field of Classification Search
CPC ................ F16D 66/028; F16D 66/021; F16D 2066/006; F16D 2200/0052;
(Continued)

(56) References Cited

U.S. PATENT DOCUMENTS 6,929,333 B2    8/2005 DeVlieg
7,086,503 B2 *  8/2006 Miller .................... B60T 17/22
                                                    188/1.11 L
(Continued)

FOREIGN PATENT DOCUMENTS

WO      2017108848 A1    6/2017

OTHER PUBLICATIONS

Extended Search Report from counterpart European Application No. 19202115.2, dated Mar. 9, 2020, 7 pp.
(Continued)

*Primary Examiner* — Anne Marie Antonucci
(74) *Attorney, Agent, or Firm* — Shumaker & Sieffert, P.A.

(57) ABSTRACT

Systems and methods for measuring the wear of carbon brakes of an aircraft are disclosed herein. The systems and methods include a 3-axis acceleration sensor module mounted on a brake assembly, the 3-axis acceleration sensor module configured to detect acceleration events of the brake assembly in three different component directions. The systems and methods further include a memory module operably connected to the 3-axis acceleration sensor module, the memory module configured to store acceleration events detected by the 3-axis acceleration sensor module and to store a pre-determined threshold for determining carbon brake wear based upon a number of acceleration events detected in a single component direction of the three different component directions. The systems and methods also include a processor module operably connected the processor module configured to compare the stored acceleration events detected in a single direction of the three different directions to the stored pre-determined threshold.

17 Claims, 6 Drawing Sheets

(51) Int. Cl.
*B64F 5/60* (2017.01)
*B64C 25/42* (2006.01)
*F16D 66/00* (2006.01)

(52) U.S. Cl.
CPC ............ *F16D 66/021* (2013.01); *B64C 25/42* (2013.01); *F16D 2066/006* (2013.01)

(58) Field of Classification Search
CPC ............ F16D 2066/003; F16D 66/027; F16D 66/023; B64F 5/60; B60T 17/221; B64C 25/42; B64D 45/00
See application file for complete search history.

(56) References Cited

U.S. PATENT DOCUMENTS

| | | |
|---|---|---|
| 8,152,246 B2 | 4/2012 | Miller et al. |
| 8,172,340 B2 | 5/2012 | DeVlieg et al. |
| 9,416,835 B2 | 8/2016 | Antanaitis et al. |
| 2007/0007088 A1 | 1/2007 | Miller et al. |
| 2007/0251308 A1 | 11/2007 | Canterbury et al. |
| 2014/0257603 A1 | 9/2014 | McKeown et al. |
| 2019/0002120 A1* | 1/2019 | Vinson .................. B64D 45/00 |

OTHER PUBLICATIONS

Response to Extended Search Report dated Mar. 9, 2020, from counterpart European Application No. 19202115.2, filed Apr. 3, 2020, 38 pp.

* cited by examiner

CARBON BRAKE WEAR STATUS MONITORING SYSTEM

TECHNICAL FIELD

The present disclosure generally relates to systems and methods for monitoring aircraft brakes. More particularly, the present disclosure relates to systems and methods for monitoring aircraft carbon brakes.

BACKGROUND

Carbon brake discs are commonly used in modern aircraft. Carbon brakes offer significant weight savings as compared to other types of brakes, such as steel brakes. This weight saving allows for a decrease in the fuel consumption of the aircraft and an associated decrease in the emission from the aircraft engines. Furthermore, carbon brakes have a higher energy absorption capability as compared to steel brakes and also have a longer expected service life.

Carbon brakes have different wear mechanisms as compared to steel brakes. In particular, steel brake wear is generally proportional to the kinetic energy absorbed by the steel brakes during any type of braking application (such as taxi braking). In contrast, carbon brake wear is primarily dependent upon on total number of braking applications experienced by the carbon brakes. As such, carbon brake wear can be directly correlated to the number of landings (and associated braking activity) of the aircraft.

A conventional carbon brake assembly 10 is shown in FIG. 1. As can be seen in FIG. 1, the carbon brake assembly 10 includes a brake housing 12, a pressure plate 14 for applying pressure to an aircraft wheel (not shown) in order to reduce the speed of rotation of the aircraft wheel via a frictional force, and a wear indicator pin 16. The amount of material remaining on the pressure plate 14, which is correlated to the amount of wear of the carbon brake assembly 10, may be checked by an aircraft technician at regular routine intervals between scheduled services in order to determine that sufficient material remains on the pressure plate 14 for effective braking.

One way that carbon brake wear can be measured is to measure a remaining length 15 of the wear indicator pin 16 present inside the brake housing 12. In particular, as material from the pressure plate 14 is lost due to braking actions, the wear indictor pin 16 will gradually displace towards the aircraft wheel. As such, the length 15 of the wear indicator pin 16 remaining inside the brake housing 12 (otherwise known as the "exposed pin length") will decrease. An aircraft technician is therefore able to physically measure this exposed pin length 15 using a ruler or calipers and then determine, on the basis of the remaining length 15 of the wear indicator pin 16, an estimated remaining service life of the carbon brake assembly 10. In particular, if it is visually determined that the exposed pin length is less than a manufacturer-determined minimum exposed pin length threshold, the aircraft technician determines that the carbon brake assembly 10 must be replaced.

Visual measurement of the exposed pin length of the wear indicator pin by the aircraft technician may prove difficult due to environmental factors, such as the amount of ambient light when measuring the exposed pin length, or due to difficulty in obtaining access to the wear indicator pin 16. Additionally, the need for visual measurement of the exposed pin length 15 of the wear indictor pin 16 means that this exposed pin length can only be measured periodically by an aircraft technician. It would be desirable to determine the service status of the carbon brakes on a more regular basis.

It is therefore desirable to improve upon the conventional methods of measuring carbon brake wear. Further advantages of exemplary embodiments will be made apparent from the following description.

BRIEF SUMMARY

This summary is provided to introduce a selection of concepts in a simplified form that are further described below in the detailed description section.

In an exemplary embodiment, there is provided a system for measuring the wear of carbon brakes of an aircraft. The system includes a 3-axis acceleration sensor module mounted on a brake assembly. The 3-axis acceleration sensor module is configured to detect acceleration events of the brake assembly in three component directions. The system also includes a memory module operably connected to the 3-axis acceleration sensor module. The memory module is configured to store acceleration events detected by the 3-axis acceleration sensor module and also to store a pre-determined threshold for determining carbon brake wear based upon a number of acceleration events detected in a single component direction of the three component directions. The system also includes a processor module operably connected to the memory module. The processor module is configured to compare the stored acceleration events detected in a single direction of the three different directions to the stored pre-determined threshold to determine a carbon brake wear status.

In another exemplary embodiment, there is provided a method of determining the wear status of a carbon brake. The method includes the step of detecting, using a 3-axis acceleration sensor module, an acceleration event in a single direction. The method includes the step of increasing by one, using a processor module, a total number of stored landing events by one when an acceleration event in the single direction is detected. The method also includes the step of comparing, using the processor module, the total number of stored landing events to a pre-determined threshold number of landing events. The method also includes the step of transmitting, using an alert module, a notification that the carbon brake should be replaced when the total number of stored landing events exceeds the pre-determined threshold number of landing events.

In another exemplary embodiment, there is provided a method of retrofitting an aircraft having carbon brakes. The method includes the step of fitting to a carbon brake assembly a 3-axis acceleration sensor module configured to detect acceleration events of the brake assembly in three component directions. The method also includes the step of fitting to the carbon brake assembly a memory module configured to store acceleration events detected by the 3-axis acceleration sensor module and also to store a pre-determined threshold for determining carbon brake wear based upon a number of acceleration events detected in a single component direction of the three component directions. The method also includes the step of fitting to the carbon brake assembly a processor module configured to compare the stored acceleration events detected in a single direction of the three different directions to the stored pre-determined threshold to determine a carbon brake wear status. The method also includes the step of operably connecting the 3-axis acceleration sensor module and the memory module to the processor module.

Other desirable features will become apparent from the following detailed description and the appended claims, taken in conjunction with the accompanying drawings and this background.

BRIEF DESCRIPTION OF THE DRAWINGS

A more complete understanding of the subject matter may be derived from the following detailed description taken in conjunction with the accompanying drawings, wherein like reference numerals denote like elements, and wherein.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the systems and methods defined by the claims. As used herein, the term "module" refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. There is no intention to be bound by any expressed or implied theory presented in the preceding Technical Field, Background, Brief Summary or the following Detailed Description.

For the sake of brevity, conventional techniques and components may not be described in detail herein. Furthermore, any connecting lines and arrows shown in the various figures contained herein are intended to represent example functional relationships and/or physical couplings between the various elements. It should be noted that many alternative or additional functional relationships or physical connections may be present in an embodiment of the present disclosure.

Figure 1:
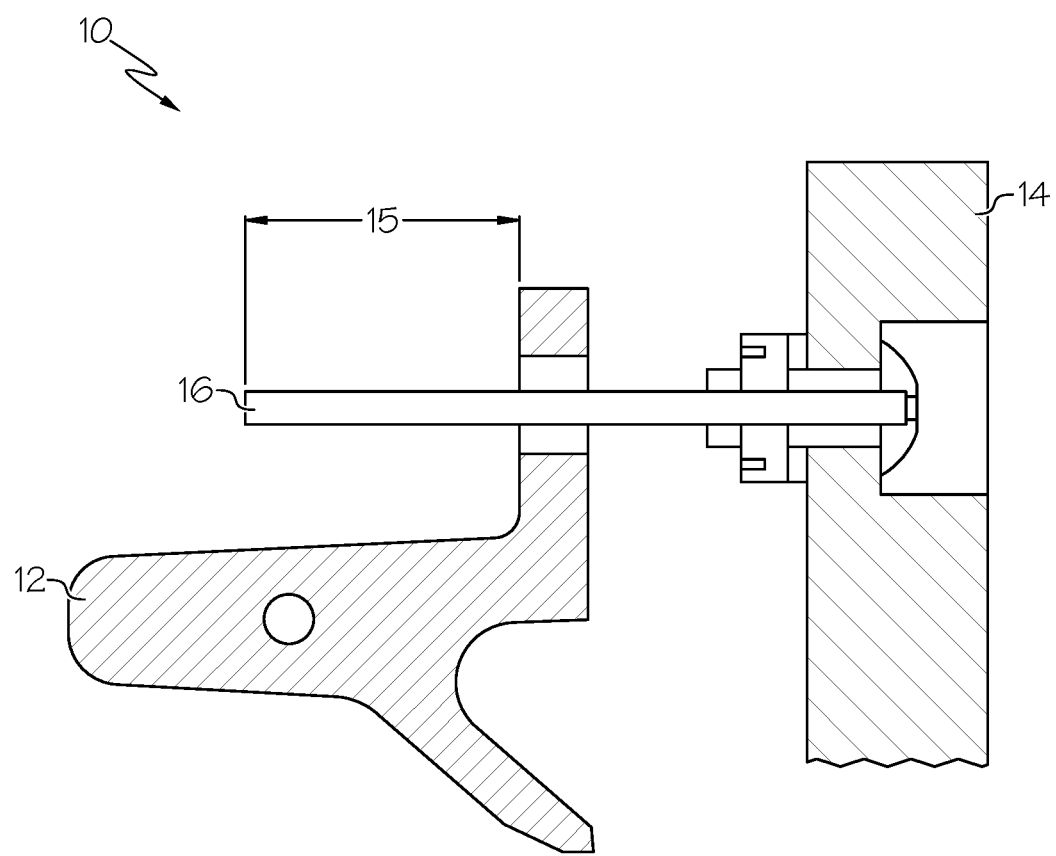
FIG. 1 shows a conventional carbon brake assembly.
Figure 2:
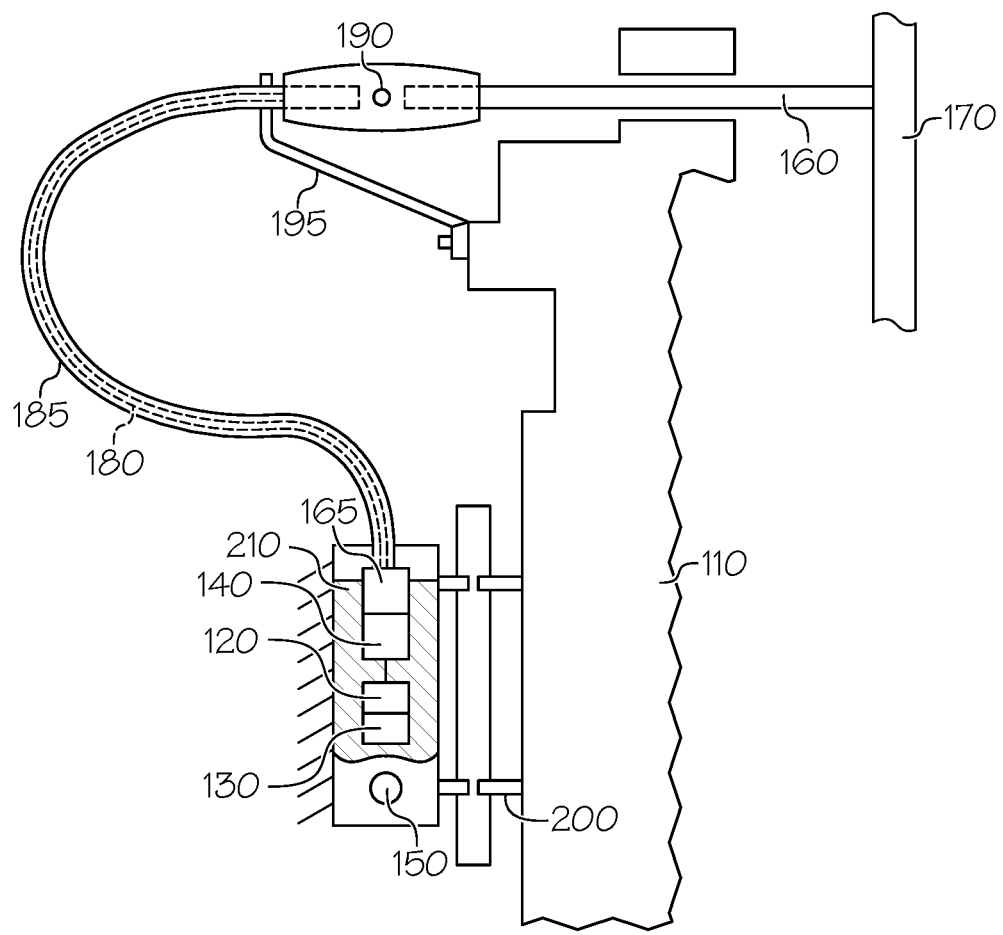
FIG. 2 shows a system for measuring carbon brake wear in accordance with exemplary embodiments.

FIG. 2 shows a schematic of a system 100 for measuring the wear of carbon brakes. The system includes a brake assembly 110. The system also includes a 3-axis acceleration sensor module 120 directly or indirectly mounted on the brake assembly 110. In various exemplary embodiments, the 3-axis acceleration sensor module 120 includes a 3-axis accelerometer, or a combination of multiple single-axis accelerometers mounted at pre-determined angles to one another. The 3-axis acceleration sensor module 120 is configured to resolve any acceleration event experienced by the brake assembly 110 into three perpendicular acceleration component directions, each component having a different direction to the other components.

The system 100 further includes a memory module 130 operably connected to the 3-axis acceleration sensor module 120. The memory module 130 is configured to store the acceleration events detected by the 3-axis acceleration sensor module 120, the acceleration events comprising a magnitude and a direction of an acceleration experienced by the brake assembly 110. As will be explained in further detail below, the memory module 130 is also configured to store a pre-determined threshold for determining carbon brake wear based upon a number of acceleration events detected in a single direction of the three component directions.

The system 100 also includes a processor module 140. The processor module 140 is operably connected to the memory module 130, such that the processor module 140 is operable to retrieve information which is stored in the memory module 130. The processor module 140 is configured to compare the acceleration events detected by the 3-axis acceleration sensor module 120 and stored in the memory module 130 to the pre-determined threshold for determining the carbon brake wear. In particular, the processor module 140 is configured to compare acceleration events which are detected in a single direction of the three different directions by the 3-axis acceleration sensor module 110 to the pre-determined threshold stored in the memory module 130 in order to determine the extent of wear of the carbon brakes, as will be explained in more detail below.

Figure 3:
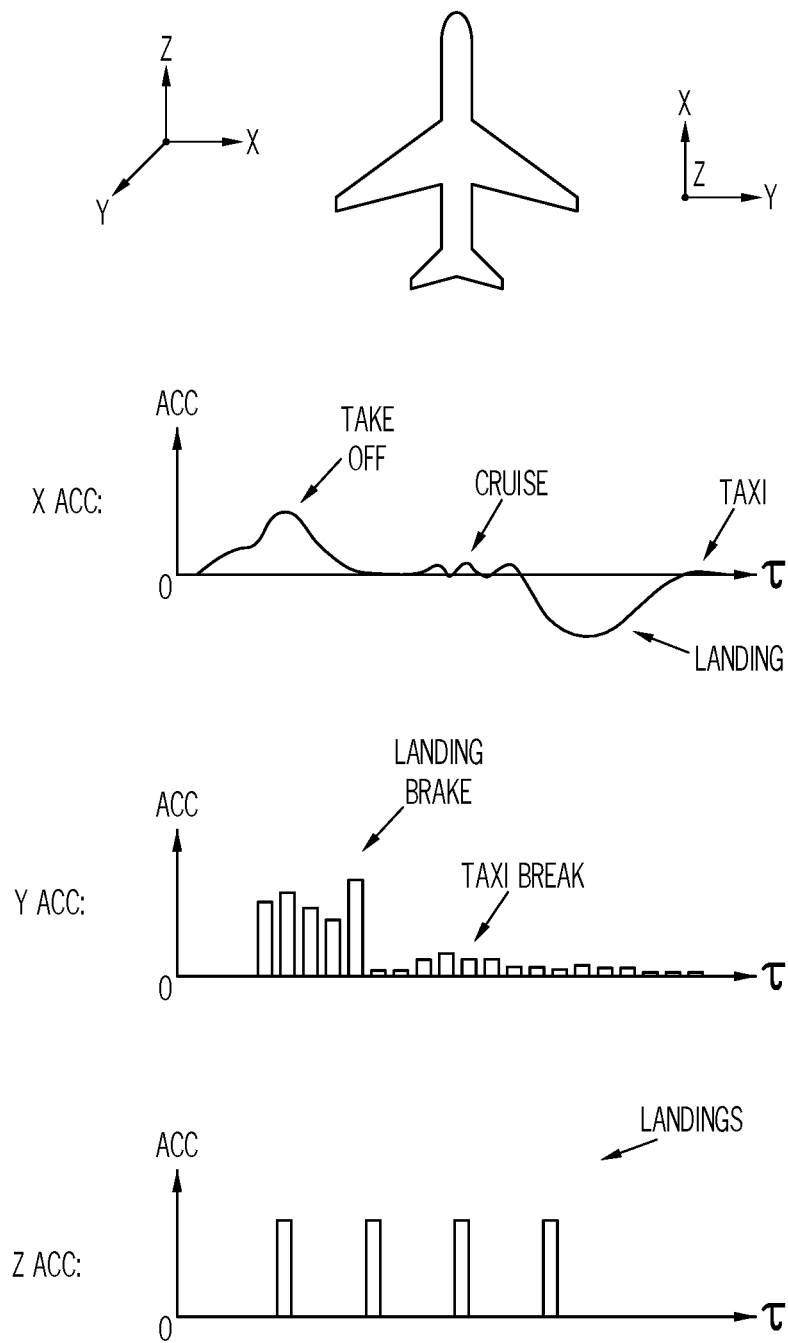
FIG. 3 shows exemplary accelerations experienced by the carbon brake assembly in accordance with exemplary embodiments.

The comparison performed by the processor module 140 is explained with reference to FIG. 3. FIG. 3 shows typical acceleration events that may be experienced by the brake assembly 110 and detected by the 3-axis acceleration sensor module 120 over a period of time encompassing multiple take-off and landing events.

The "X-axis" accelerations shown in FIG. 3 correspond to the accelerations detected by the 3-axis acceleration sensor module 120 along an axis parallel to the fuselage of the aircraft over multiple take-off and landing events. As can be seen in FIG. 3, each take-off event results in a "positive" acceleration being detected along this X-axis, whereas each landing event results in a "negative" acceleration being detected along this X-axis. Smaller accelerations experienced during flight at a cruising altitude and experienced during aircraft taxi maneuvers are also detected by the 3-axis acceleration sensor module 130 along this X-axis.

The "Y-axis" accelerations shown in FIG. 3 correspond to the accelerations detected by the 3-axis acceleration sensor module 120 along an axis parallel to the wingspan direction of the aircraft over multiple take-off and landing events. As can be seen in FIG. 3, several acceleration events may be experienced along this Y-axis during take-off and landing events, such as accelerations resulting from one or more applications of the landing brake during a landing event and also smaller accelerations resulting from the application of taxi brakes prior to take-off and after landing.

The "Z-axis" accelerations shown in FIG. 3 correspond to the accelerations detected by the 3-axis acceleration sensor module 120 along an axis perpendicular to both of the Y- and X-axes. As can be seen in FIG. 3, the main source of acceleration events experienced by the brake assembly 110 in this direction are aircraft landing events. Other types of acceleration events experienced by the brake assembly 110 generally do not have a large component in this direction.

The memory module 130 is configured to store the acceleration events detected by the 3-axis acceleration sensor module 120 in at least one of the 3 different directions. Preferably, the memory module 130 is configured to store the acceleration events detected by the 3-axis acceleration sensor module 120 in all three of the X-, Y- and Z-axis directions.

The processor module 140 is configured to access the acceleration events stored in the memory module 130 corresponding to landing events and then compare the total number of the stored acceleration events corresponding to landing events to a pre-determined number of landings threshold in order to determine the extent of carbon brake wear.

In an exemplary embodiment, the processor module 140 is configured to access the acceleration events along the "Z-axis", where any detected acceleration event is likely to correspond to a landing event. The processor module 140 then compares the total number of detected acceleration events in this direction to a pre-determined number of landings threshold. If the total number of detected acceleration events in this direction exceeds the pre-determined number of landings threshold, the processor module 140 is configured to determine that the brake assembly 110 should be replaced.

The pre-determined threshold number of landing events threshold may be based on a manufacturer-recommended service life of the carbon brakes, which service life is defined based on the number of landings experienced by the carbon brakes. As such, if the processor module determines, on the basis of the comparison, that the total number of determined landing events experienced by the brake assembly 110 exceeds the manufacturer-recommended service life of the carbon brakes, as determined by a total number of landings experienced by the carbon brakes, the processor module 140 then determines that the carbon brakes should be replaced.

In order to ensure that smaller detected accelerations in a certain direction are not erroneously determined as landing events, in various exemplary embodiments the processor module 140 is configured to compare the acceleration events detected in the particular direction to a magnitude threshold in order to determine if a particular acceleration event corresponds to an aircraft landing event. In exemplary embodiments, the processor module 140 is configured to compare the magnitude of each acceleration event detected along the Z-axis. If the magnitude of the acceleration event is greater than a pre-determined magnitude threshold indicative of a landing event, the processor module 140 is configured to determine that the stored acceleration event along the Z-axis corresponds to an aircraft landing event. If the magnitude of the acceleration event is less than the pre-determined magnitude threshold indicative of a landing event, the processor module 140 is configured to determine that the stored acceleration event along the Z-axis does not correspond to an aircraft landing event, and this acceleration event does not cause the total number of landing events experienced by the carbon brake assembly to increase.

In various other exemplary embodiments, the processor module 140 may be configured to compare the magnitude of acceleration events along the X- or Y-axis to a pre-determined threshold in order to determine whether an acceleration event along one of these axes corresponds to an aircraft landing event. For example, the processor module 140 may determine that a landing event has occurred if a deceleration event that has a magnitude greater than a pre-determined deceleration threshold is detected along the X-axis, or if an acceleration that has a magnitude greater than a pre-determined magnitude is detected along the Y-axis. The total number of landing events determined by the processor module 140 is then stored in the memory module 130, and compared to the manufacturer-recommended service life by the processor module 140 in the same manner as described above with respect to the Z-axis direction.

Referring again to FIG. 2, in exemplary embodiments, when the processor module 140 determines that the total number of determined landing events exceeds the manufacturer-specified recommended service life of the carbon brakes, the processor module 140 is configured to cause an alert module 150 operably connected to the processor module 140 to alert a member of the flight crew or aircraft technician that the carbon brakes should be replaced. In exemplary embodiments, the alert module 150 is configured to transmit a signal to a remote monitoring device 300 in order to provide a notification that the carbon brakes should be replaced. In an exemplary embodiment, the remote monitoring device 300 comprises a handheld monitoring device that can be carried by an aircraft technician, and the alert module 150 transmits the alert signal to the handheld monitor via a wireless connection such as Wifi™, Bluetooth®, or RFID. Additionally or alternatively, the alert module 150 includes a physical data transfer connection port, such as a USB port, and the alert signal can be transmitted over this physical data transfer connection when the remote monitoring device 300 is connected to the physical data transfer connection port. Additionally or alternatively, the alert module 150 may transmit a visual or audible alert, for example via an LED or buzzer. By using an alert module 150 to transmit a wear status of the carbon brakes in this manner, the wear status of the carbon brake assembly may be assessed more frequently as compared to conventional methods of assessing the wear status of the brakes.

Referring again to FIG. 2, in exemplary embodiments the 3-axis acceleration sensor module 120 includes one or more vibration dampers 200. The one or more vibration dampers 200 act to shield the 3-axis acceleration sensor module 120 from detecting high-frequency vibrations caused, for example, by aircraft engine vibrations. As such, the one or more vibration dampers 200 essentially act as a low-pass frequency filter for the 3-axis acceleration sensor module 120, such that only lower frequency accelerations (such as those frequencies caused by take-off, landing or taxi braking events) are detected by the 3-axis acceleration sensor 120. Additionally, the one or more vibration dampers 200 act to increase the service life of the circuitry of the electronic modules by reducing the forces experienced by these modules.

In exemplary embodiments the system 100 further includes a wear indicator pin 160 connected to a pressure pad 170. The pressure pad 170 is configured to slow a rotational speed of an aircraft wheel (not shown) through the application of a frictional force to the aircraft wheel. In a similar manner to conventional systems, an exposed pin length of the wear indicator pin 160 can be correlated to the remaining material on the pressure pad 170, and this exposed pin length therefore provides another indication of the wear of the carbon brake assembly 110.

In exemplary embodiments, the wear indictor pin 160 is connected to an exposed pin length sensor module 165 via a conductive flexible shaft 180. In an exemplary embodiment, the exposed pin length sensor module 165 is a linear distance displacement detector that is configured to determine the amount of displacement experienced by the wear indicator pin 160 in order to determine the exposed pin length of the wear indicator pin.

In an exemplary embodiment, the exposed pin length sensor module 165 comprises an ammeter, voltmeter or another type of electrical measurement component that allows for the indirect or direct measurement of electrical resistance. In use, the exposed pin length sensor 165 is configured to measure the electrical resistance of a circuit that includes the brake assembly 110, the conductive flexible shaft 180 and a conductive connector 190 configured to connect the conductive flexible shaft to the wear indicator pin 160. As the exposed pin length of the indicator pin 160 decreases due to a loss of material of the carbon brakes, the conductive connector 190 moves relative to the brake assembly 110 and the conductive flexible shaft 180, thereby increasing the overall length of this circuit. As the overall length of this electrical circuit increases, the resistance of this electrical circuit also increases in a corresponding manner. The resistance change of the circuit is then correlated with the change in length of the circuit by the exposed pin length sensor module 165, and, by extension, the change in the exposed pin length of the indicator pin 160 is detected by the exposed pin length sensor module 165. In this manner, the exposed pin length of the indicator pin 160 can be monitored by the exposed pin length sensor module 165, and this exposed pin length may be used as an additional source of information for determining the wear of the carbon brakes. In exemplary embodiments the flexible shaft 180 is covered by a non-conductive sleeve 185 to prevent erroneous resistance readings in situations where the flexible shaft 180 contacts another conducting component of the system 100.

As described above, in an exemplary embodiment, the conductive flexible shaft 180 is connected to the brake assembly by means of a conductive connector 190. In an embodiment, the conductive connection 190 comprises a turnbuckle connection, which allows for a quick and reliable attachment and detachment mechanism between the wear indicator pin 160 and the conductive flexible shaft 180. In this embodiment, the conductive flexible shaft 180 is maintained in a pre-determined position relative to the brake assembly 100 via a retainer 195.

In other exemplary embodiments, alternative potentiometer-based position measurement techniques may be used to determine the exposed pin length of the wear indicator pin 160. For example, the exposed pin length sensor module 165 may be an optical measurement device for measuring the exposed pin length of the wear indicator pin 160.

Preferably, the exposed pin length sensor module 165 is configured to convert an analog electrical signal used to detect the change in exposed pin length of the wear indicator pin 160 into a digital signal for digital processing by the processor module 140. In exemplary embodiments, the analog-to-digital signal conversion is a 24-bit conversion. A 24-bit analog-to-digital conversion allows for a small enough resolution of the converted digital signal in order to allow for the detection of a 0.0127 mm change in length of the exposed pin length of the wear indicator pin 160, which is typically the smallest change in the wear indictor pin 160 necessary to be detected to indicate a change in status of the service life of the carbon brake assembly 110.

In exemplary embodiments, the exposed pin length sensor module 165 is operably connected to the processor module 140. The exposed pin length sensor module 165 is configured to transmit the measured exposed pin length of the wear indictor pin 160 to the processor module 140, and the processor module 140 is configured to determine the brake wear status of the carbon brakes on the basis on both of the number of landing events experienced by the aircraft and also the measured exposed pin length of the indictor pin 160.

For example, in exemplary embodiments, the processor module 140 is configured to determine that the carbon brakes should be replaced if either of one of two conditions is met—that the total number of determined landings exceeds a pre-determined threshold number of total landings corresponding to a manufacturer-recommended service life of the carbon brakes; or that the exposed pin length of the wear indicator pin 160 decreases to below a pre-determined length threshold.

In an exemplary embodiment, if either one of these conditions is satisfied, the processor module 140 is configured to cause the alert module 150 to transmit an alert that the carbon brakes should be replaced. In alternative exemplary embodiments, each of the determined measured exposed pin length and the number of landings is taken into account by the processor module 120 when determining, through the use of a more complex mathematical model stored in the memory module 130, the extent of the wear of the carbon brakes, and the processor module 140 is configured to cause the alert module 150 to transmit an alert that the carbon brakes should be replaced on the basis of an output of the mathematical model.

Still further, in exemplary embodiments, the system 100 includes a heat sink 210 for conducting heat away from the electronics of the processor module 140, the memory module 130, the exposed pin length sensor module 165 and other electronic components included in the system 100, in order to increase the expected service life of these electronic components.

Figure 4:
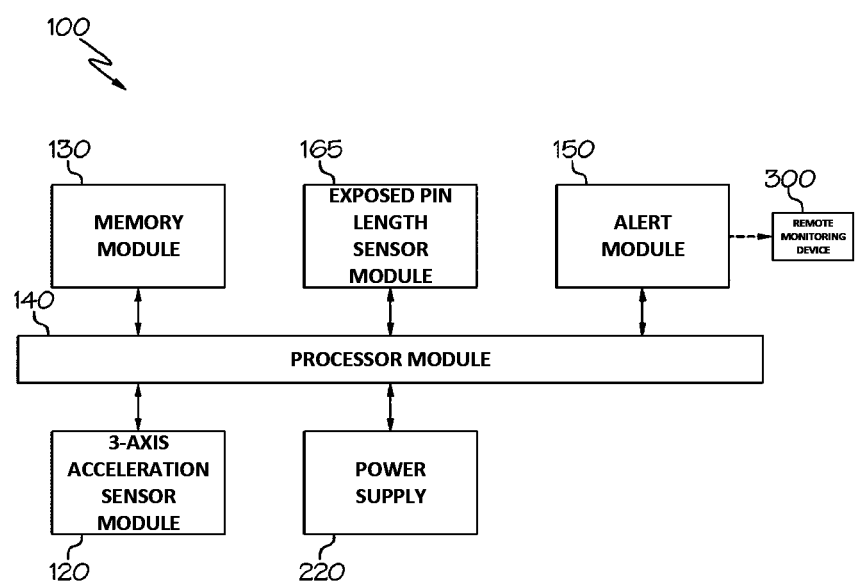
FIG. 4 shows a functional block diagram of a system of detecting carbon brake wear.

FIG. 4 shows a functional block diagram of certain electronic components included in the system 100. As can be seen in FIG. 4, various electronic components included in the system 100 include the processor module 140, the 3-axis acceleration sensor module 120, the memory module 130 and the exposed pin length sensor module 165. The 3-axis acceleration sensor module 120, the memory module 130 and the exposed pin length sensor module 165 are each operably connected (shown through the use of arrows) to the processor module 140, such that the number of determined landing events and the measured exposed pin length of the wear indicator pin can both be used by the processor module 140 in determining whether the carbon brakes should be replaced.

As can also be seen in FIG. 4, the system 100 includes a power supply 220, for example a battery module, for supplying power to the electronic components. In particular, the power supply 220 is configured to supply the various electronic components in the system with sufficient power to perform the above-mentioned functions. For clarity, in FIG. 4 the power supply 220 is shown only with one power connection to the processor module, but in practice the power supply 220 supplies power directly or indirectly to each one of the electronic modules in the system 100.

In exemplary embodiments, the processor module 140 is configured to switch between "active" and "sleep" modes. As defined herein, in an "active" mode, the processor module 140 is configured to perform one or more of the functions described above. In contrast, in the "sleep" mode, the processor module 140 is configured to draw a minimum amount of power from the power supply 220 and to not perform the above-described functions, in order to conserve the energy of the power supply.

In exemplary embodiments, the detection of an acceleration event by the 3-axis acceleration sensor module 120 is used as the "wake" command to switch the processor module 140 from the "sleep" mode to the "active" mode. Preferably, the processor module 140 is configured to wake from a "sleep" mode and perform the above-described functions only after an acceleration event is detected by the 3-axis acceleration sensor module 120 that is of a sufficient magnitude to register as a "landing event". In exemplary embodiments, after the elapse of a pre-determined period of time after the wake-up event, the processor module 140 is then configured to revert to the "sleep" mode if no further acceleration events of sufficient magnitude are detected. In this manner, power supply energy may be conserved.

Figure 5:
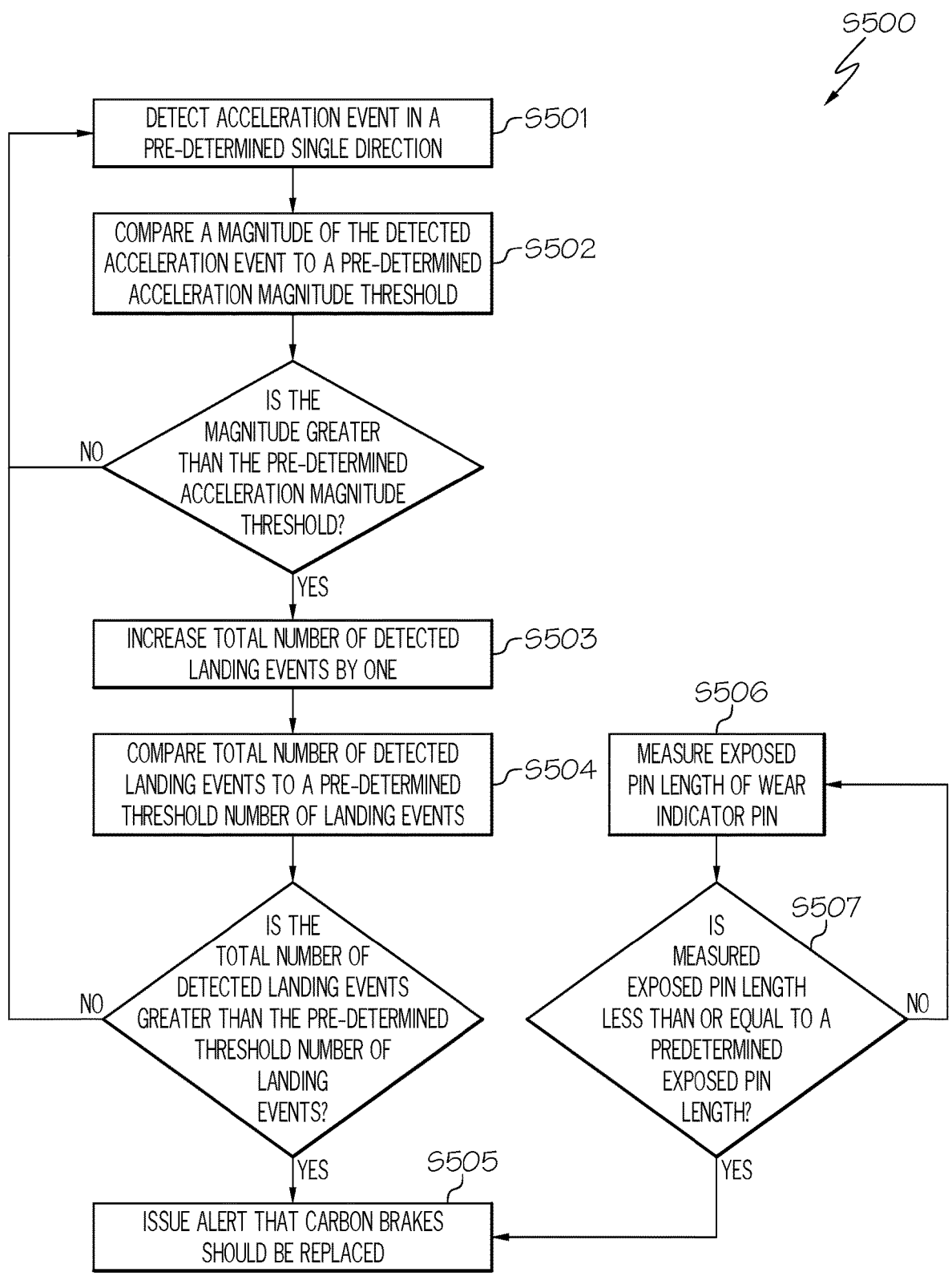
FIG. 5 shows a flowchart of a method in accordance with exemplary embodiments.

Turning to FIG. 5, a method S500 of determining the wear status of a carbon brake for an aircraft in shown.

At Step S501, an acceleration event in a pre-determined single direction is detected using a 3-axis acceleration sensor module. If optional Step S502 is not included, the method progress to step S503. If optional Step S502 is included, the method progresses to step S502.

At optional Step S502, a magnitude of the detected acceleration event is compared, using a processor module, to a pre-determined acceleration magnitude threshold. If the magnitude of the detected acceleration event is greater than the pre-determined acceleration magnitude threshold, the detected acceleration event is determined as corresponding to a landing event of the aircraft and the method then progresses to Step S503. If the magnitude of the detected acceleration event is less than the pre-determined acceleration magnitude, the method reverts to step S501.

At step S503, a total number of detected landing events stored in a memory module is increased, by the processor module, by one. The method then progresses to step S504.

At step S504, the total number of detected landing events is compared, using a processor, to a pre-determined threshold number of landing events, for example a manufacturer-recommended service life of a carbon brake. If the total number of detected landing events is less than the manufacturer-recommended service life of the carbon brake, the method reverts to Step S501. If the total number of detected landing events is equal to or greater than the service life, the method progresses to Step S505.

At step S505, an alert is issued, using an alert module, to notify a user that the carbon brakes should be replaced. In exemplary embodiments, the alert is issued wirelessly, for example by Wifi, Bluetooth or via RFID. In exemplary embodiments, the alert is issued over a wired transmission medium, for example by a USB port connection.

The method S500 may also include additional optional steps S506 and S507.

At Step S506, an exposed pin length of a wear indicator pin is measured, using a exposed pin length sensor module. After the exposed pin length of the wear indicator pin is measured, the method progresses to Step S507.

At Step S507, the measured exposed pin length of the wear indictor pin is compared, using a processor, to a predetermined exposed pin length indicative of the need to replace the carbon brakes. If the measured exposed pin length is greater the predetermined exposed pin length, the method reverts to Step S506. If the measured exposed pin length is less than or equal to the predetermined exposed pin length, the method progresses to Step S505.

Figure 6:
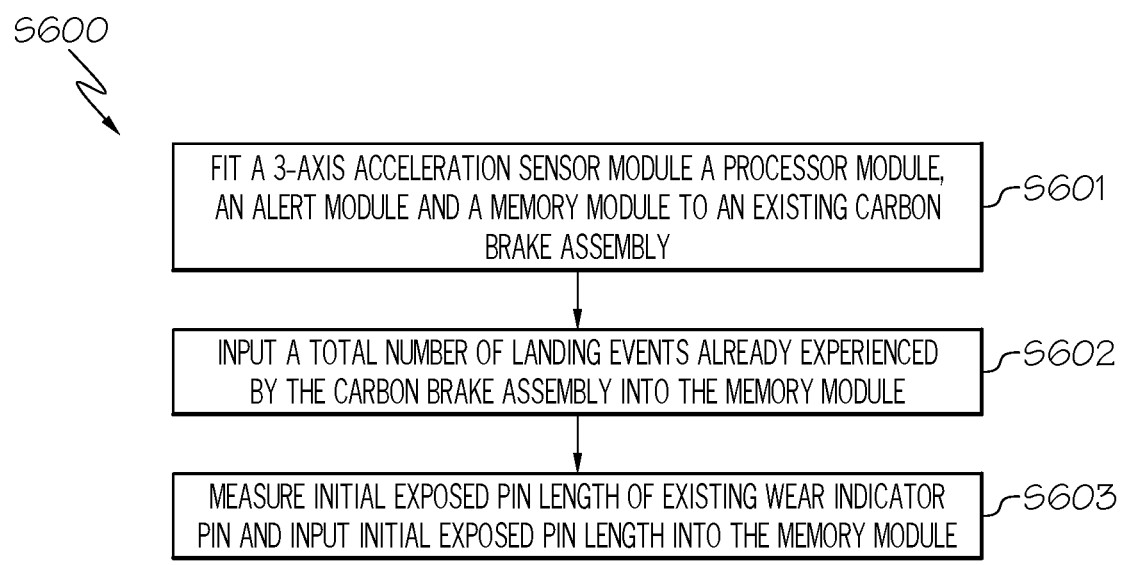
FIG. 6 shows a flowchart of another method in accordance with exemplary embodiments.

Turning now to FIG. 6, a method S600 of retrofitting an existing carbon brake assembly including a wear indicator pin is shown.

At Step S601, a 3-axis acceleration sensor module is fitted to the existing carbon brake assembly. Also at Step S601, a memory module configured to store detected acceleration events in a particular direction and to store a pre-determined acceleration magnitude threshold indicative of whether a specific acceleration event corresponds to an aircraft landing event is fitted to the existing carbon brake assembly. Also at Step S601, a processor module adapted to compare detected acceleration events in a particular direction to the pre-determined acceleration magnitude threshold is fitted to the existing carbon brake assembly. Optionally, also at step S601, an alert module is fitted to the existing carbon brake assembly. The memory module, the 3-axis acceleration sensor module and the optional alert module are fitted to the carbon brake assembly in a manner such that these components are operably connected to the processor module. Optionally, vibration dampers may be used in the mounting of the various modules to the existing carbon brake assembly.

At step S602, the total number of landings events already experienced by the carbon brake assembly are entered into the memory module. This total number of landing events experienced by the carbon brake assembly may be obtained, inter alia, from flight records or maintenance records relating to the aircraft.

At optional step S603, a wear indicator sensor is fitted to an existing wear indicator pin of the carbon brake assembly. In an exemplary embodiment, the wear indicator sensor is attached to the wear indicator pin, for example via a turnbuckle and conductive flexible shaft. The wear indicator sensor is configured to detect, through the use of electrical resistance measurements, a change in the exposed pin length of the wear indicator pin.

Also at optional step S603, the initial exposed pin length of the wear indicator pin is measured by a user and this initial measured exposed pin length is stored in the memory module. In an exemplary embodiment, after this initial measured exposed pin length is stored in the memory module, the electrical resistance corresponding to the initial measured exposed pin length is determined, using the processor module. Any change in electrical resistance can then be correlated to a change in the exposed pin length of the wear indicator pin.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:
1. A system for measuring wear of pressure pads of carbon brakes of an aircraft, comprising:
 a 3-axis acceleration sensor module mounted on a brake assembly, the 3-axis acceleration sensor module configured to detect acceleration events of the brake assembly in three different component directions;
 a memory module operably connected to the 3-axis acceleration sensor module, the memory module configured to store acceleration events detected by the 3-axis acceleration sensor module and to store a pre-determined threshold for determining the wear of the pressure pads of the carbon brakes based upon a number of acceleration events detected in a single component direction of the three different component directions; and a processor module operably connected to the memory module, the processor module configured to compare the stored acceleration events detected in a single direction of the three different directions to the stored pre-determined threshold and determine an extent of the wear of the pressure pads of the carbon brakes based at least in part on the comparison.

2. The system of claim 1, wherein the processor module is configured to compare a magnitude of each acceleration event detected by the 3-axis acceleration sensor module to a pre-determined magnitude threshold, and wherein the memory module is configured to only store the detected acceleration event if the magnitude of the detected acceleration event is greater than the pre-determined magnitude threshold.

3. The system of claim 1, wherein the system further comprises a wear indicator pin and a wear indicator sensor module configured to measure an exposed pin length of the wear indicator pin.

4. The system of claim 3, wherein the wear indicator sensor module determines the exposed pin length of the wear indicator pin on the basis of electrical resistance measurements.

5. The system of claim 1, further comprising vibration dampers configured to provide a low-pass frequency filter function for the 3-axis acceleration sensor module.

6. The system of claim 1, further comprising an alert module configured to transmit an alert signal that the brake assembly should be replaced when the processor module determines that the number of stored acceleration events detected in the single direction exceeds the stored pre-determined threshold.

7. The system of claim 6, wherein the alert module is configured to wirelessly transmit the alert signal to a remote monitoring device.

8. The system of claim 1, wherein the processor module is configured to alternate between a sleep mode and an active mode, wherein the processor module is configured to use minimal power in the sleep mode and to operate normally in the active mode, and wherein the processor module is configured to switch from the sleep mode to the active mode when an acceleration event is detected by the 3-axis acceleration sensor module.

9. A method of determining a wear status of a pressure pad of a carbon brake of an aircraft, comprising:
detecting, using a 3-axis acceleration sensor module, an acceleration event in a single direction;
increasing by one, using a processor module, a total number of stored landing events when an acceleration event in the single direction is detected;
comparing, using the processor module, the total number of stored landing events to a pre-determined threshold number of landing events; and
transmitting, using an alert module, a notification that the pressure pad of the carbon brake should be replaced when the total number of stored landing events exceeds the pre-determined threshold number of landing events.

10. The method of claim 9, wherein the step of detecting an acceleration event further comprises comparing, using the processor module, a magnitude of the acceleration event in the single direction to a pre-determined threshold magnitude, and wherein the step of increasing by one the total number of stored landing events is performed only if the magnitude of the detected acceleration event is greater than the pre-determined magnitude.

11. The method of claim 9, wherein the method further includes measuring, using a exposed pin length sensor, an exposed pin length of a wear indicator pin of the carbon brake; comparing the measured exposed pin length to a predetermined exposed pin length threshold; and transmitting, using the alert module, a notification that the pressure pad of the carbon brake should be replaced when the measured exposed pin length is less than the predetermined exposed pin length threshold.

12. The method of claim 11, wherein the step of measuring the exposed pin length of the wear indicator pin comprises measuring the exposed pin length using electrical resistance measurements.

13. The method of claim 9, wherein the step of transmitting the notification that the pressure pad of the carbon brake should be replaced comprises wirelessly transmitting the notification that the pressure pad of the carbon brake should be replaced to a remote monitoring device.

14. The method of claim 9, wherein the processor module is configured to switch between a low-power "sleep" mode and an "active" mode, wherein the processor module is configured to switch between the sleep mode and the active mode when an acceleration event is detected.

15. A method of retrofitting an aircraft having carbon brakes, comprising:
fitting, to an existing carbon brake assembly:
a 3-axis acceleration sensor module configured to detect acceleration events of the brake assembly in three component directions,
a memory module configured to store acceleration events detected by the 3-axis acceleration sensor module and to store a pre-determined threshold for determining carbon brake wear based upon a number of acceleration events detected in a single component direction of the three component directions, and
a processor module configured to compare the stored acceleration events detected in a single direction of the three different directions to the stored pre-determined threshold to determine a wear status of a pressure pad of the carbon brakes; and
operably connecting the 3-axis acceleration sensor module and the memory module to the processor module.

16. The method of claim 15, further comprising the step of fitting to the carbon brake assembly an exposed pin length sensor module to a wear indicator pin of the carbon brake assembly and operably connecting the exposed pin length sensor module to the processor module.

17. The method of claim 15, further comprising the step of fitting vibration dampers to the carbon brake assembly.

* * * * *